United States Patent [19]

Kinoshita

[11] Patent Number: 5,390,352
[45] Date of Patent: Feb. 14, 1995

[54] VECTOR PROCESSING DEVICE COMPRISING A SINGLE SUPPLYING CIRCUIT FOR USE IN BOTH STRIDE AND INDIRECT VECTOR PROCESSING MODES

[75] Inventor: Koji Kinoshita, Tokyo, Japan
[73] Assignee: NEC Corporation, Tokyo, Japan
[21] Appl. No.: 768,040
[22] Filed: Oct. 1, 1991
[30] Foreign Application Priority Data Oct. 2, 1990 [JP] Japan .................................. 2-264139

[51] Int. Cl.⁶ .............................................. G06F 15/16
[52] U.S. Cl. ...................................... 395/800; 395/375;
395/725; 364/736; 364/DIG. 1; 364/232.21; 364/243
[58] Field of Search ....................... 395/425, 800, 375; 364/736, 731

[56] References Cited

U.S. PATENT DOCUMENTS

| 4,745,547 | 5/1988 | Buchholz et al. ............... | 395/800 |
| 4,870,569 | 9/1989 | Nakatari et al. ............... | 395/425 |
| 4,888,679 | 12/1989 | Fossum et al. ............... | 395/800 |
| 4,949,247 | 8/1990 | Stephenson et al. .......... | 364/736 |
| 5,019,968 | 5/1991 | Wang et al. ................... | 364/736 |

FOREIGN PATENT DOCUMENTS 0232827 8/1987 European Pat. Off. .
0282070 9/1988 European Pat. Off. .

*Primary Examiner*—Alyssa H. Bowler
*Assistant Examiner*—Mehmet Geckil
*Attorney, Agent, or Firm*—Foley & Lardner

[57] ABSTRACT

A device for processing vector data for a memory device into indirect memory input data and an indirect address signal or stride vector input data and a stride address signal depending on whether in an indirect vector processing mode or a stride vector processing mode. The vector processing device comprises a vector data control unit for receiving, when in the indirect mode in response to an indirect register select command, first and second selected data of the vector data from first and second registers. A buffer unit holds the first and the second selected data. As the indirect memory input data and the indirect address signal, an access control unit supplies the memory address and the memory device with the second and the first selected data held in the buffer unit. The same supplying circuitry can supply stride vector data to the memory device when in the stride mode.

4 Claims, 8 Drawing Sheets

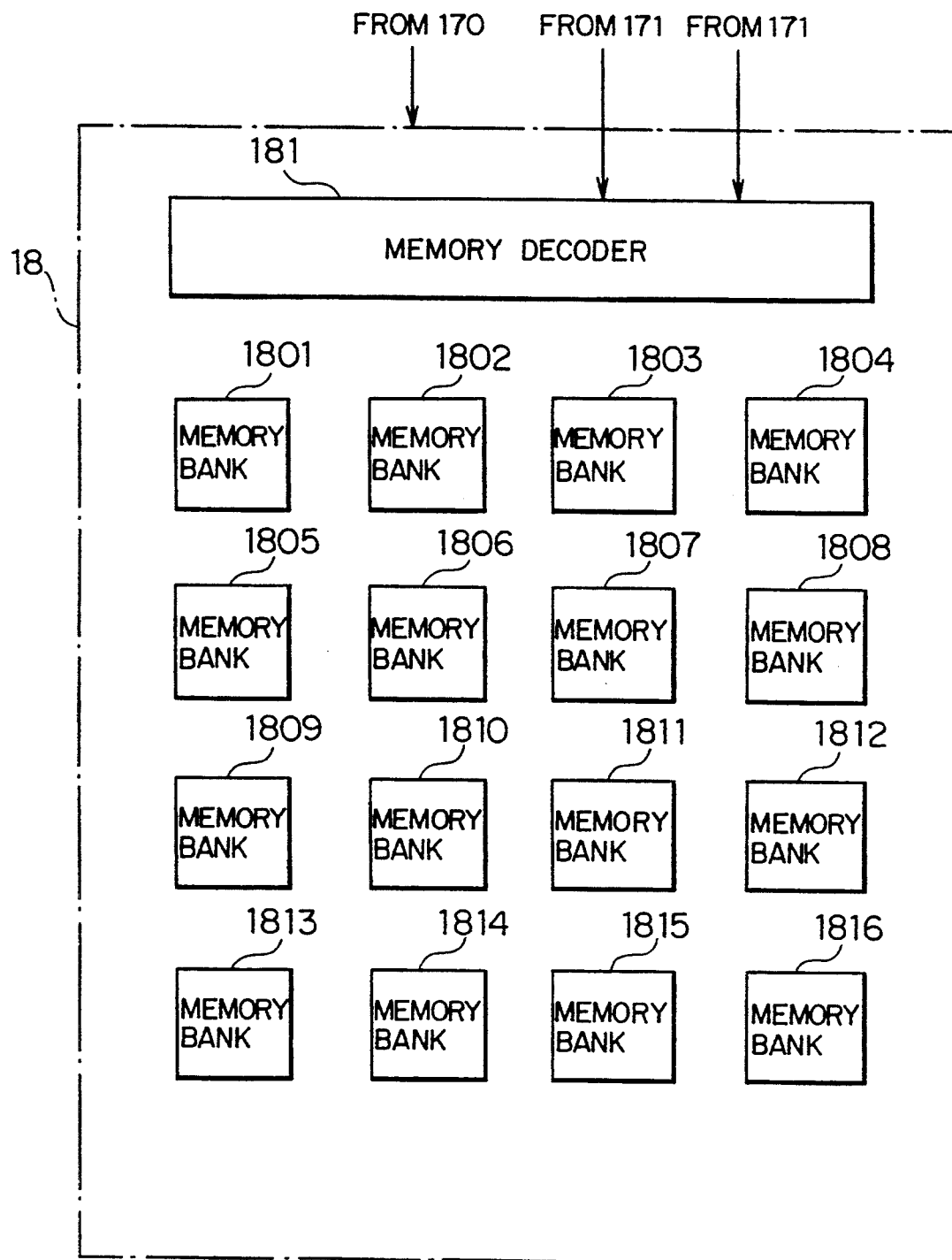
F I G. 2

VECTOR PROCESSING DEVICE COMPRISING A SINGLE SUPPLYING CIRCUIT FOR USE IN BOTH STRIDE AND INDIRECT VECTOR PROCESSING MODES

BACKGROUND OF THE INVENTION

The present invention relates to a vector processing device which is selectively operable in a stride vector processing mode and an indirect vector processing mode. A vector processing device of the type described, comprises a stride vector processing circuit and an indirect vector processing circuit.

In the vector processing device, each of the stride vector processing circuit and the indirect vector processing circuit has a supplying circuit for supplying a stride vector and an indirect vector to a memory device used in combination with the vector processing device. Consequently, the vector processing device must comprise a large amount of hardware.

SUMMARY OF THE INVENTION

It is therefore an object of the present invention to provide a vector processing device which comprises a single supplying circuit for use in both stride and vector processing modes.

Other objects of this invention will become clear as the description proceeds.

According to this invention, there is provided a vector processing device which is for use in combination with a memory device and is selectively operable in a stride vector processing mode and an indirect vector processing mode of processing vector data into an indirect memory input signal comprising an indirect memory input data and an indirect address signal indicative of a memory address of the memory device. The vector processing device comprises a command control unit for producing, in compliance with a program, an indirect register select signal and an indirect mode signal representative of the indirect vector processing mode, vector data control unit connected to the command control unit and a plurality of vector registers for selecting, in response to the indirect register select signal, first and second registers of the vector registers, to receive first and second selected data from the first and the second registers, a buffer unit connected to the vector data control unit for holding, as first and second held data, the first and the second selected data received by the vector data control unit, and an access control unit connected to the memory device, the command control unit, and the buffer unit for supplying, in response to the indirect mode signal, the first held data as the indirect address signal to the memory device and the second held data as the indirect memory input data to the address of the memory device.

BRIEF DESCRIPTION OF THE DRAWING

FIG. 2 is a block diagram of the memory device illustrated in FIG. 1;

DESCRIPTION OF THE PREFERRED EMBODIMENT

Figure 1:
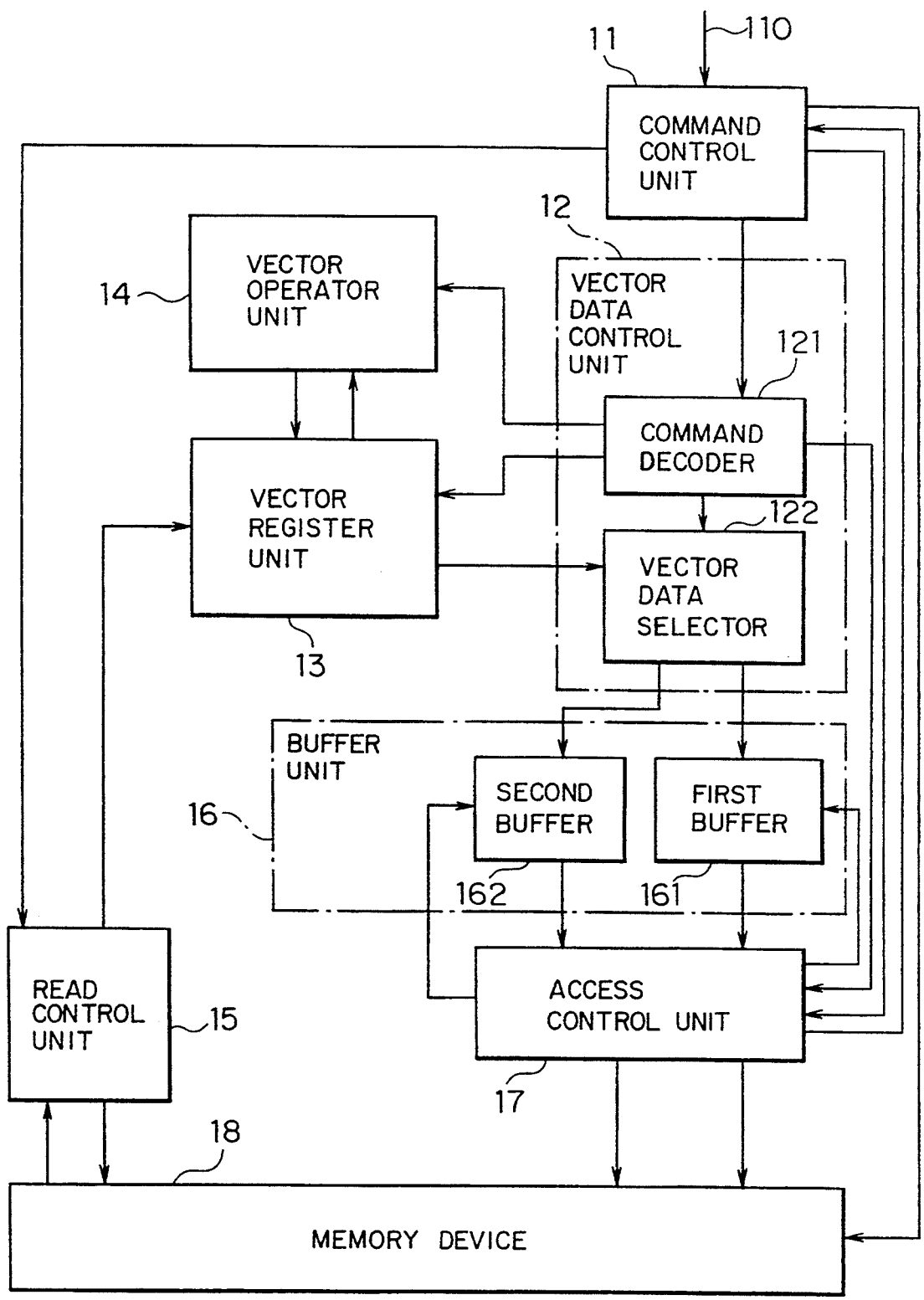
FIG. 1 is a block diagram of a vector processing device according to an embodiment of this invention and a memory device used in combination with the vector processing device.

Referring to FIG. 1, a vector processing device according to a preferred embodiment of this invention comprises a command control unit 11, a vector data control unit 12, a vector register unit 13, a vector operator unit 14, a read control unit 15, a buffer unit 16, and an access control unit 17. The vector processing device is for use in combination with a memory device 18. The vector processing device is selectively operable in a stride vector processing mode for processing stride vector data and an indirect vector processing mode for processing indirect vector data. The vector processing device operates in accordance with clock pulses of a clock signal. The command control unit 11 is connected to the vector data control unit 12, the read control unit 15, the access control unit 17, and the memory device 18. The vector data control unit 12 is connected to the vector register unit 13, the vector operator unit 14, the buffer unit 16, and the access control unit 17. The vector register unit 13 is connected to the vector operator unit 14 and the read control unit 15. The read control unit 15 is connected to the memory device 18. The access control unit 17 is connected to the buffer unit 16 and the memory device 18.

Turning to FIG. 2, the memory device 18 comprises a memory decoder 181 and a plurality of memory banks 1801 to 1816. The memory banks 1801 to 1816 have access ports (not shown), respectively, so as to be accessed separately. Each of the memory banks 1801 to 1816 comprises a predetermined number of memory elements (not shown) each of which is assigned with at least one of memory addresses consecutively increasing in relation to the memory elements in the memory banks 1801 to 1816. The memory elements are for memorizing memory data.

Turning back to FIG. 1, the command control unit 11 is supplied with a program 110 from an input device (not shown). The command control unit 11 produces, in compliance with the program 110, a vector control signal, a read control signal, an access control signal, a memory control signal, a head address signal, an element distance signal, and an element number signal. The vector data control unit 12 comprises a command decoder 121 and a vector data selector 122. The command decoder 121 is connected to the command control unit 11 and is supplied with the vector control signal from the command control unit 11 to produce a stride register select signal, an indirect register select signal, a stride mode signal representative of the stride vector processing mode, an indirect mode signal representative of the indirect vector processing mode, a vector register write control signal, a vector register read control signal, a vector operator control signal, and an input data.

Figure 3:
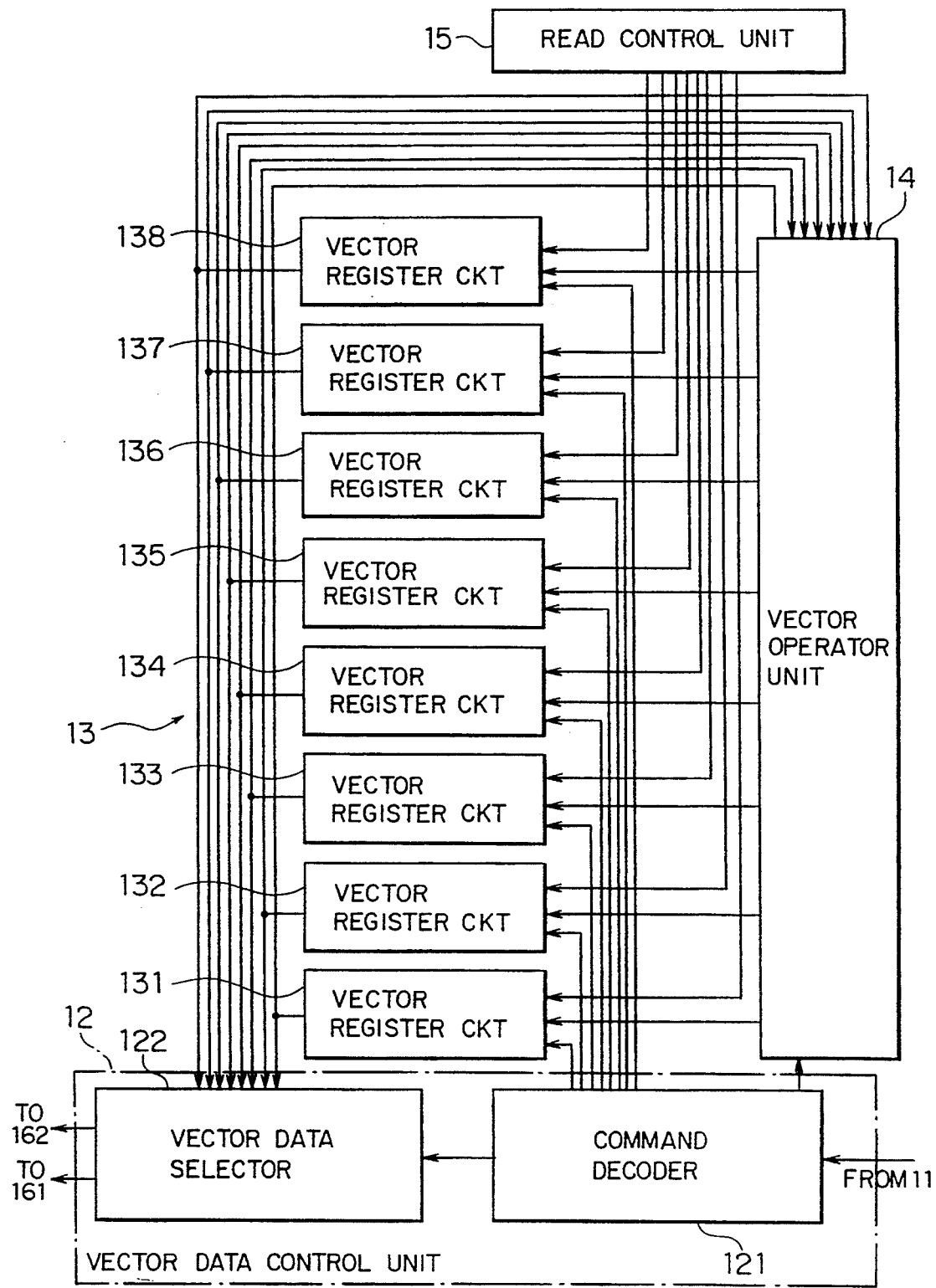
FIG. 3 is a block diagram of a vector register unit and other parts of the vector processing device illustrated in FIG. 1.

Turning to FIG. 3, the vector register unit 13 comprises first through eighth vector register circuits 131 to 138. Each of the vector register circuits 131 to 138 is connected to the command decoder 121, the vector data selector 122, the vector operator unit 14, and the read control unit 15. The command decoder 121 is connected to the vector operator unit 14.

Turning back to FIG. 1, the memory device 18 is supplied with the memory control signal from the command control unit 11 and is put in operation in response to the memory control signal. The read control unit 15 is supplied with the read control signal from the command control unit 11 and reads the memory data of the memory elements in response to the read control signal supplied from the command control unit 11 to supply the memory data to the vector register circuits 131 to 138 as vector data. The vector register circuits 131 to 138 are supplied with the input data from the command decoder 121 and memorize the input data as the vector data. The vector operator unit 14 is supplied with the vector data from the vector register circuits 131 to 138 and operates the vector data in response to the vector operator control signal supplied from the command decoder 121, to produce operated vector data and supply the operated vector data to the vector register circuits 131 to 138. The vector register circuits 131 to 138 memorize the operated vector data as the vector data.

Figure 4:
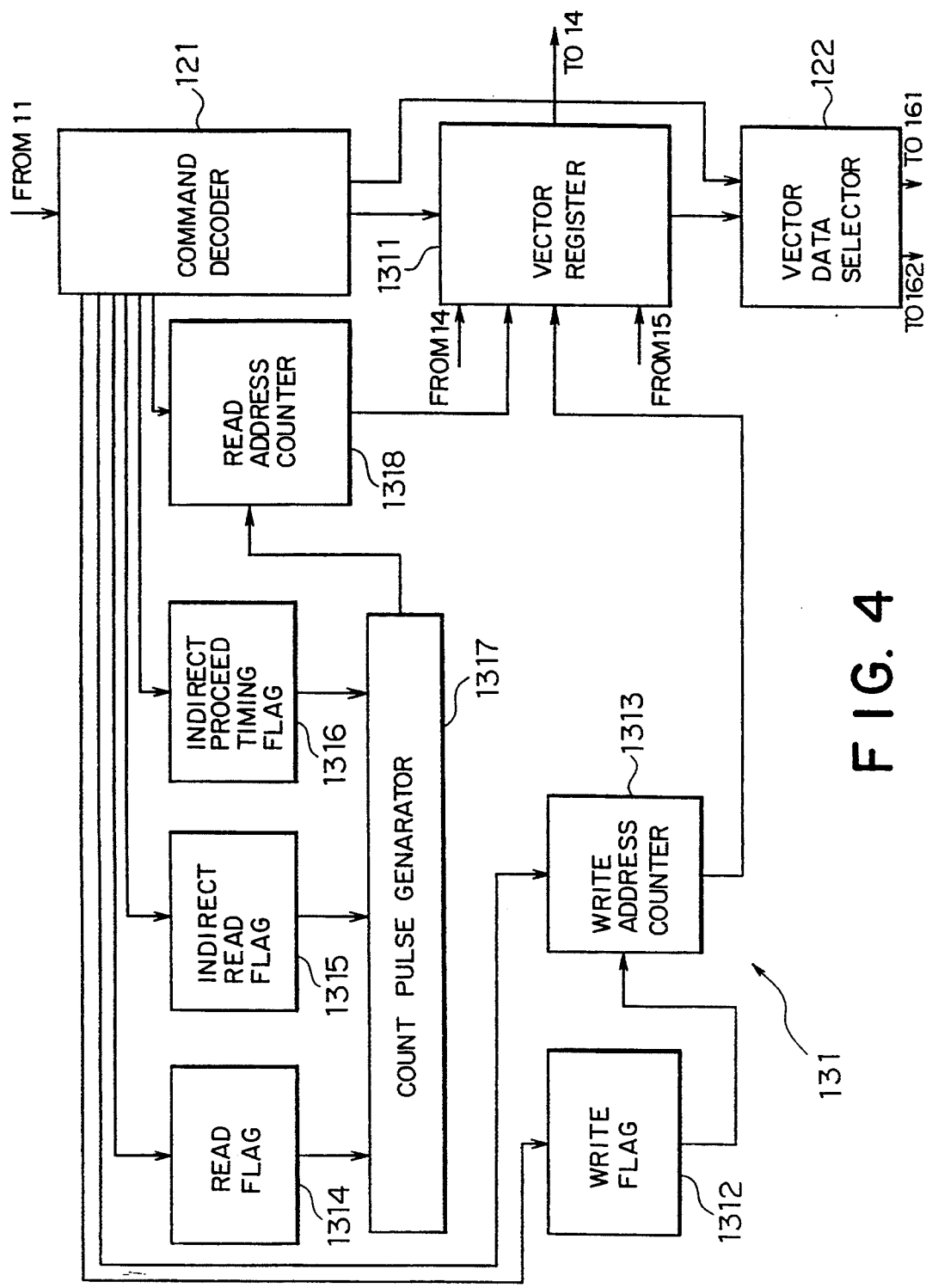
FIG. 4 is a block diagram of a first vector register circuit for use in the vector register unit illustrated in FIG. 3.

Turning to FIG. 4, the vector register circuit 131 comprises a vector register 1311, a write flag 1312, a write address counter 1313, a read flag 1314, an indirect read flag 1315, an indirect proceed timing flag 1316, a count pulse generator 1317, and a read address counter 1318. The vector register 1311 comprises a predetermined number of register elements (not shown) each of which is assigned with at least one of register address consecutively increasing in relation to the register elements. The register elements are for memorizing register vector data. Each of the vector register 1311, the write flag 1312, the write address counter 1313, the read flag 1314, the indirect read flag 1315, the indirect proceed timing flag 1316, and the read address counter 1318 is connected to the command decoder 121 and supplied with the vector control signal from the command decoder 121. The vector register 1311 is connected to the write address counter 1313 and the read address counter 1318. The count pulse generator 1317 is connected to the read flag 1314, the indirect read flag 1315, the indirect proceed timing flag 1316, and the read address counter 1318. The write flag 1312 alternately has a logic "1" level and a logic "0" level in accordance with the clock pulses when supplied with the vector register write control signal from the command decoder 121. The write flag 1312 supplies a write pulse signal to the write address counter 1313 when the write flag 1312 has the logic "1" level. The write pulse signal comprises a succession of write pulses. Supplied with the vector register write control signal from the command decoder 121, the write address counter 1313 counts the number of the write pulse signals supplied from the write flag 1312 and produces a register write address signal indicative of the register address of the register element in response to the number of the write pulse signals to supply the register write address signal to the vector register 1311. Supplied with the register write signal from the write address counter 1313, the vector register 1311 memorizes in the register element indicated by the register write signal, as the register data, the operated vector data delivered from the vector operator unit 14.

Supplied with the vector register read control signal from the command decoder 121, the read flag 1314 becomes to have a logic "1" level to supply a register read signal to the count pulse generator 1317. Supplied with the indirect mode signal from the command decoder 121, the indirect read flag 1315 becomes to have a logic "1" level to supply an indirect read signal to the count pulse generator 1317. Supplied with the indirect mode signal from the command decoder 121, the indirect proceed timing flag 1316 alternately has a logic "1" level and a logic "0" level in accordance with the clock pulse to supply an indirect pulse signal to the count pulse generator 1317 when the indirect proceed timing flag 1316 has the logic "1" level.

The count pulse generator 1317 produces read count pulses in accordance with the clock pulses when the read flag 1314 produces the register read signal and the indirect read flag 1315 does not produce the indirect read signal. The count pulse generator 1317 produces the read count pulse in accordance with the indirect pulse signal from the indirect proceed timing flag 1316 when the read flag 1314 produces the register read signal and furthermore when the indirect read flag 1315 produces the indirect read signal. Supplied with the read count pulse from the count pulse generator 1317 and with the indirect mode signal from the command decoder 121, the read address counter 1318 counts the number of the read count pulses to produce a register read address signal indicative of the register address in response to the number of the read count pulses and supply the register read address signal to the vector register 1311. Supplied with the register read address signal from the read address counter 1318, the vector register 1311 reads the register vector data out of the register element indicated by the register read address signal and supplies the register vector data to the vector data selector 122. Likewise, each of the vector register circuits 132 to 138 comprises a vector register, a write flag, a write address counter, a read flag, an indirect read flag, an indirect proceed timing flag, a count pulse generator, and a read address counter.

Turning back to FIG. 3, it will be assumed that the vector data selector 122 is supplied with the stride mode signal and the stride register select signal from the command decoder 121. Under the circumstances, the vector data selector 122 selects, as a primary register, one of the vector registers 1311 in the first through the eighth vector register circuits 131 to 138 that is indicated by the stride register selected signal. The vector data selector 122 receives, as a primary selected data, the register vector data from the primary register and supply the primary selected data to the buffer unit 16 (FIG. 1). Supplied with the indirect mode signal and the indirect register select signal, the vector data selector 122 selects, as first and second registers, two of the vector registers 1311 in the first through the eighth vector registers 131 to 138 that are indicated by the indirect register select signal. The vector data selector 122 receives, as first and second selected data, the register data from the first and the second registers and supply the first and the second selected data to the buffer unit 16 (FIG. 1).

Figure 5:
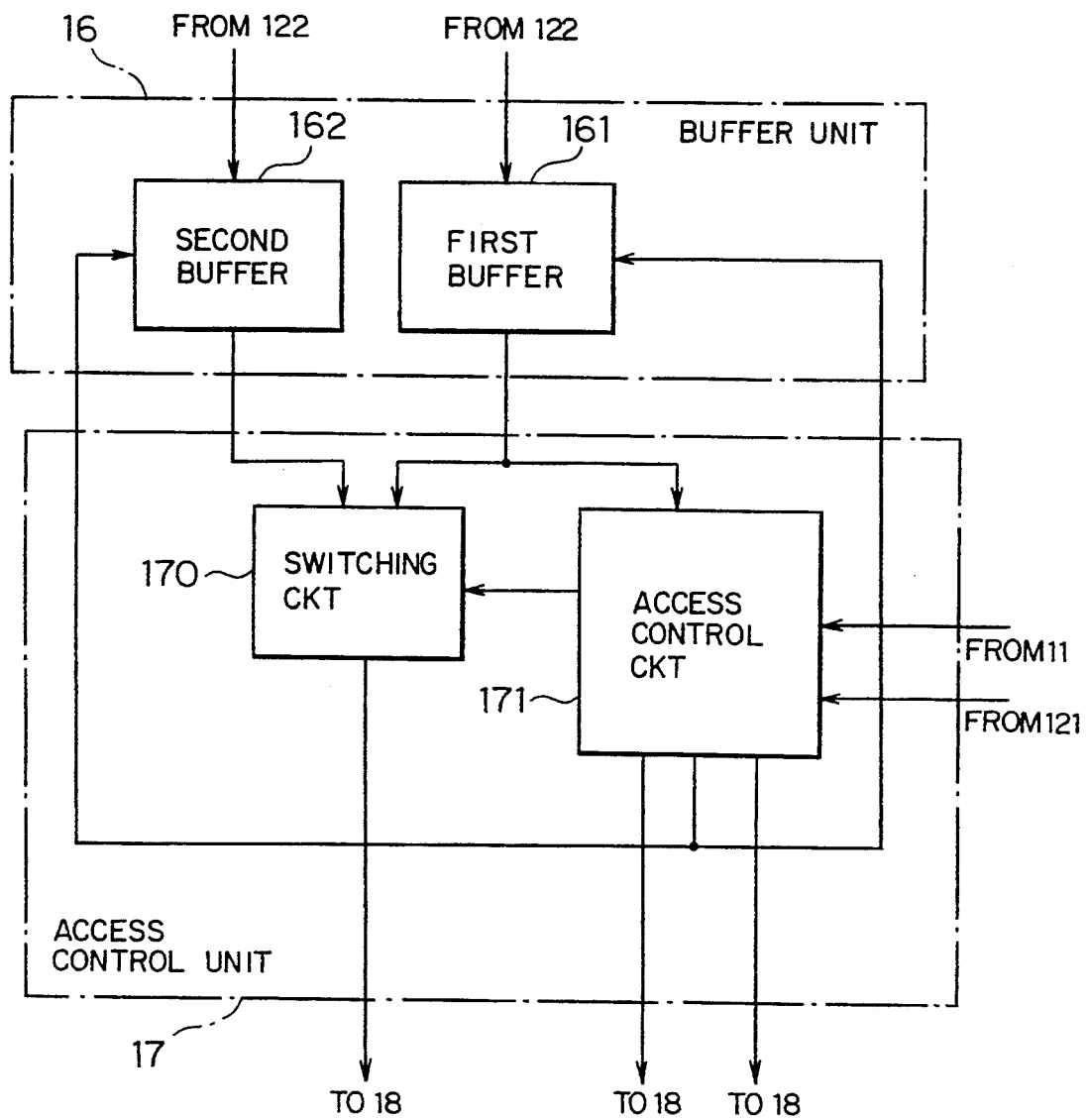
FIG. 5 is a block diagram of a buffer unit and an access control unit for use in the vector processing device illustrated in FIG. 1.

Turning to FIG. 5, the buffer unit 16 comprises a first buffer 161 and a second buffer 162. Each of the first and the second buffers 161 and 162 is connected to the vector data selector 122. The access control unit 17 comprises a switching circuit 170 and an access control circuit 171. The switching circuit 170 is connected to the first and the second buffers 161 and 162, the access control circuit 171, and the memory banks 1801 to 1816 of the memory device 18 (FIG. 2). The access control circuit 171 is connected to the first and the second buffers 161 and 162 and the memory decoder 181 of the memory device 18 (FIG. 2).

Each of the first and the second buffers 161 and 162 comprises a predetermined number of buffer elements (not shown) each of which is assigned with at least one of buffer addresses consecutively increasing in relation to the buffer elements. The buffer elements are for memorizing buffer data.

The first and the second buffers 161 and 162 are alternately supplied with the primary selected data and memorize, as a primary buffer data, the primary selected data when the vector data selector 122 supplies the primary selected data to the buffer unit 16. When the vector data selector 122 supplies the first and the second selected data to the buffer unit 16, the first buffer 161 is supplied with the first selected data and memorizes, as a first buffer data, the first selected data while the second buffer 162 is supplied with the second selected data and memorizes, as a second buffer data, the second selected data.

Figure 6:
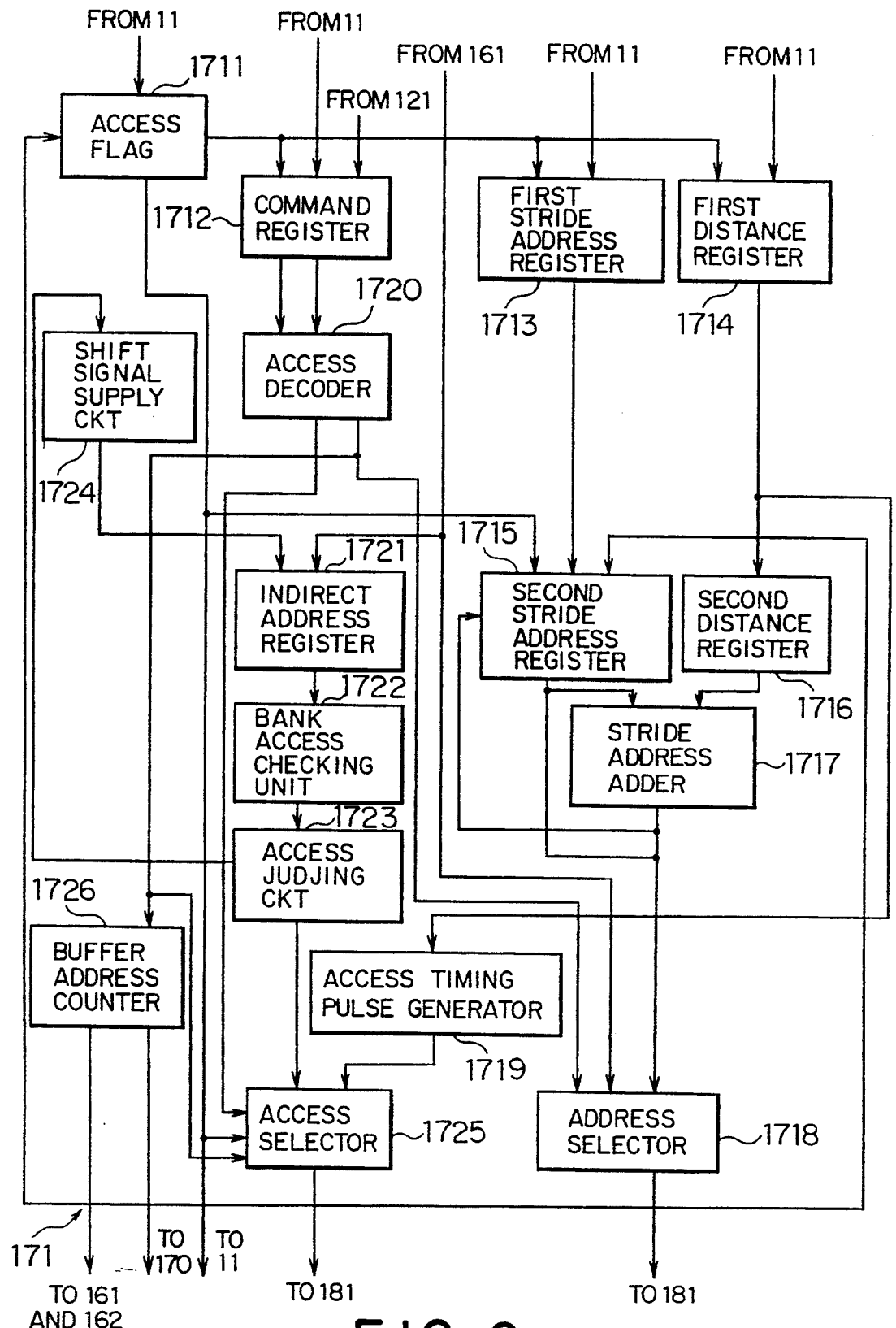
FIG. 6 is a block diagram of an access control circuit for use in the access control unit illustrated in FIG. 5.

Turning to FIG. 6, the access control circuit 171 comprises an access flag 1711, a command register 1712, a first stride address register 1713, a first distance register 1714, a second stride address register 1715, a second distance register 1716, a stride address adder 1717, an address selector 1718, an access timing pulse generator 1719, an access decoder 1720, an indirect address register 1721, a bank access checking unit 1722, an access judging circuit 1723, a shift signal supply circuit 1724, an access selector 1725, and an indirect address counter (also known as the buffer address counter) 1726.

The access flag 1711 is connected to the command control unit 11 (FIG. 1). Supplied with the access control signal from the command control unit 11, the access flag 1711 becomes to have a logic "1" level and produce an access signal. The access flag 1711 supplies the access signal to the command control unit 11 through a downwardly depicted connection, a command register 1712, first stride address register 1713, and a first distance register 1714. The command register 1712 is connected to the command control unit 11 and the command decoder 121. Supplied with the access signal from the access flag 1711, the stride mode signal from the command decoder 121, and the element number signal from the command control unit 11, the command register 1712 memorizes, as a stride mode held signal and an element number held signal, the stride mode signal and the element number signal. The element number signal represents the number of elements of the stride vector data. Supplied with the access signal from the access flag 1711 and the indirect mode signal from 121, the command register 1712 memorizes, as an indirect mode held signal, the indirect mode signal.

The first stride address register 1713 is connected to the command control unit 11 (FIG. 1). Supplied with the access signal from the access flag 1711 and the head address signal, the first stride address register 1713 memorizes, as a head address held signal, the head address signal representing the memory address which memorizes a head element of the stride vector. The first distance register 1714 is connected to the command control unit 11 (FIG. 1). Supplied with the access signal from the access flag 1711 and the element distance signal from the command control unit 11, the first distance register 1714 memorizes, as an element distance held signal, the element distance signal representing a distance of two elements of the stride vector.

The second stride address register 1715 is connected to the access flag 1711, the first stride address register 1713, the stride address adder 1717, and the access selector 1725. Supplied with the access signal from the access flag 1711 and the head address held signal from the first stride address register 1713, the second stride address register 1715 memorizes, as a register stride address signal, the head address held signal. Supplied with the access signal from the access flag 1711, an added stride address signal from the stride address adder 1717, and a selected access signal from the access selector 1725 (not shown), the second stride address register 1715 memorizes, as the register stride address signal, the added stride address signal. The second distance register 1716 is connected to the first distance register 1714. Supplied with the element distance held signal from the first distance register 1714, the second distance register 1716 memorizes, as a register element distance signal, the element distance held signal.

The stride address adder 1717 is connected to the second stride address register 1715 and the second distance register 1716, the stride address adder 1717 calculates an address sum of the number of an address indicated by the register stride address signal and the number of an address indicated by the register element distance signal to produce an added stride address signal representative of the address sum. The address selector 1718 is connected to the stride address adder 1717, the access decoder 1720, and the first buffer 161. Supplied with an access stride mode signal from the access decoder 1720 and the added stride address signal from the stride address adder 1717, the address selector 1718 supplies, as a stride address signal, the added stride address signal to the memory decoder 181 of the memory device 18 (FIG. 2). The stride address signal indicates one of the memory addresses of the memory device 18. Supplied with an access indirect mode signal from the access decoder 1720 and the first buffer data from the first buffer 161, the address selector 1718 supplies, as an indirect address signal, the first buffer data to the memory decoder 181 of the memory device 18 (FIG. 2).

The access timing pulse generator 1719 is connected to the first distance register 1714 and the access selector 1725. The access timing pulse generator 1719 comprises an access pulse counter and an access comparator (not shown) connected to the access pulse counter. Each of the access pulse counter and the access comparator of the access timing pulse generator 1719 is connected to the first distance register 1714 and the access comparator is connected to the access selector 1725. Supplied with the element distance held signal from the first distance register 1714, the access pulse counter of the access timing pulse generator 1719 counts the number of the clock pulses as a counted number to produce a counted number signal representative of the counted number. Supplied with the element distance held signal from the first distance register 1714 and the counted number signal from the access pulse counter, the access comparator of the access timing pulse generator 1719 compares an element number indicated by the element distance held signal and the counted number indicated by the counted number signal to produce an access stride timing pulse signal when the element number is equal to the counted number. Supplied with the access stride timing pulse signal from the access comparator, the access pulse counter is cleared.

The access decoder 1720 is connected to the command register 1712, the address selector 1718, the access selector 1725, and the indirect address counter 1726. Supplied with the stride mode held signal from the command register 1712, the access decoder 1720 produces the access stride mode signal to supply the access stride mode signal to the address selector 1718, the access selector 1725, and the buffer address counter 1726. Supplied with the element number held signal from the command register 1712, the access decoder 1720 produces a decoded element signal to supply the decoded element signal to the access selector 1725. The decoded element signal is identical with the element number held signal. Supplied with the indirect mode held signal from the command register 1712, the access decoder 1720 produces the access indirect mode signal to supply the access indirect mode signal to the address selector 1718, the access selector 1725, and the indirect address counter 1726.

Figure 7:
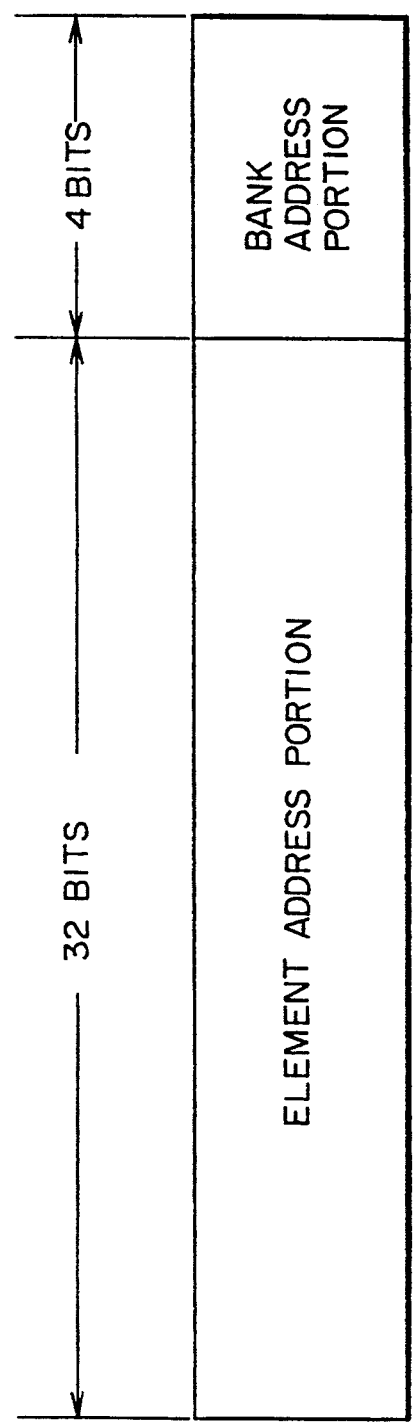
FIG. 7 is a schematic diagram of a first held data for use in the access control circuit illustrated in FIG. 6.

The indirect address register 1721 is connected to the first buffer 161, the shift signal supply circuit 1724, and the bank access checking unit 1722. It may be mentioned here that the first buffer data in the first buffer 161 comprises a bank address portion and an element address portion (FIG. 7). The bank address portion has four bits. The element address portion has thirty-two bits. The bank address portion indicates one of the memory banks 1801 to 1816 (FIG. 2). The element address portion indicates one of the memory elements of the memory banks 1801 to 1816 (FIG. 2). Supplied with the first buffer data from the first buffer 161, the indirect address register 1721 memorizes, as a bank address held signal, the bank address portion of the first buffer data. Supplied with a shift signal from the shift signal supply circuit 1724 in the manner which will presently be described, the indirect address register 1721 supplies the bank address held signal to the bank access checking unit 1722.

Figure 8:
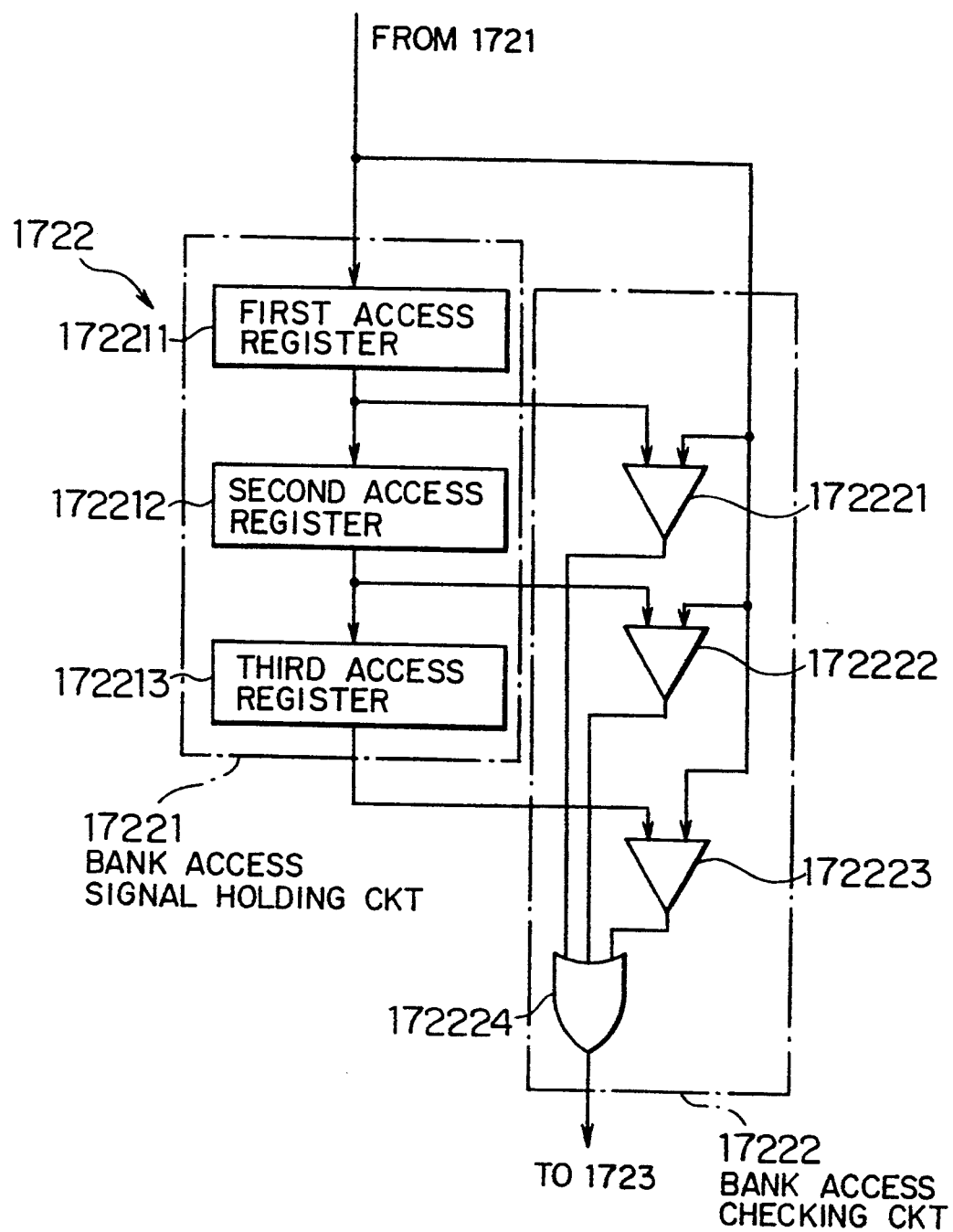
FIG. 8 is a block diagram of a bank access checking unit for use in the access control circuit illustrated in FIG. 6.

Turning to FIG. 8, the bank access checking unit 1722 comprises a bank access signal holding circuit 17221 and a bank access checking circuit 17222. The bank access signal holding circuit 1722 is connected to the indirect address register 1721 and comprises first through third access registers 172211 to 172213. Supplied with the bank address held signal from the indirect address register 1721, the first access register 172211 memorizes, as a first memorized signal, the bank address held signal when the first access register 172211 receives on of the clock pulses of the clock signal. Supplied with the first memorized signal, the second access register 172212 memorizes, as a second memorized signal, the first memorized signal on reception of a following one of the clock pulses of the clock signal. Likewise, the third access register 172213 memorizes, as a third memorized signal, the second memorized signal on reception of one of the clock pulses that next follows the following one of the clock pulses. Thus, the first bank access signal holding circuit 1722 holds the first through the third memorized signals collectively as a bank access held signal.

The bank access checking circuit 17222 is connected to the indirect address register 1721 (FIG. 6) and the first through the third access registers 172211 to 172213. The bank access checking circuit 17222 comprises first through third comparators 172211 to 172223 and OR gate 172224.

The first comparator is connected to the indirect address register 1721 and the first access register 172211. Supplied with the bank address held signal from the indirect address register 1721 and the first memorized signal from the first access register 172211, the first comparator 172221 compares the bank address held signal and the first memorized signal to produce a first access coincidence signal when the bank address held signal and the first memorized signal coincide with each other.

The second comparator 172222 in connected to the indirect address register 1721 (FIG.6) amd the second access register 172212. Supplied with the bank address held signal from the indirect address register 1721 and the second memorized signal from the second access register 172212, the second comparator 172222 compares the bank address held signal and the second memorized signal to produce a second access coincidence signal when the bank address held signal and the second memorized signal coincide with each other.

The third comparator 172223 is connected to the indirect address register 1721 (FIG. 6) and the third access register 172213. Supplied with the bank address held signal from the indirect address register 1721 and the third memorized signal from the third access register 172213, the third comparator 172223 compares the bank address held signal and the third memorized signal to produce the third access coincidence signal when the bank address held signal and the third memorized signal coincide with each other.

The OR gate 172224 is connected to the first through the third comparators 172221 to 172223. Supplied with the first through the third access coincidence signal from the first through the third comparators 172221 to 172223, the OR gate outputs its ORed signal as a bank coincidence signal.

Turing back to FIG. 6, the access judging circuit 1723 is connected to the bank access checking circuit 17222 (FIG. 8). Supplied with the bank coincidence signal from the bank access checking circuit 17222, the access judging circuit 1723 produces an inhibit signal. The access judging circuit 1723 produces the shift signal when the bank access checking circuit 1722 does not produce the bank coincidence signal. The shift signal supply circuit 1724 is connected to the access judging circuit 1723. Supplied with the shift signal from the access judging circuit 1723, the shift signal supply circuit 1724 supplies the shift signal to the indirect address register 1721.

The access selector 1725 is connected to the access flag 1711, the access decoder 1720, the access timing pulse generator 1719, the second distance register 1716, and the memory decoder 181 of the memory device 18 (FIG. 2). Supplied with the access signal from the access flag 1711, the access stride timing pulse signal from the access timing pulse generator 1719, the access stride mode signal, and the decoded element signal, the access selector 1725 produces the selected access signal to supply the selected access signal to the second stride address register 1715 and the memory decoder 181 of the memory device 18 (FIG. 2), counts the number of the access stride mode signals to produce timing pulse number signal, and compares a first number of the timing pulse number signal and a second number indicated by the decoded element signal to produce an off signal when the first number is equal to the second number.

Supplied with the off signal from the access selector 1725, the access flag 1711 becomes the logic "0" level. Supplied with the access signal from the access flag 1711 and the access indirect mode signal from the access decoder 1720, the access selector 1725 produces the selected access signal to supply the selected access signal to the memory decoder 181 of the memory device 18 (FIG. 2).

The buffer address counter 1726 is connected to the access decoder 1720 and the first and the second buffers 161 and 162. The buffer address counter 1726 comprises first through sixth flip-flops (not shown) representing first through sixth figures. The first flip-flop of the buffer address counter 1726 is connected to the switching circuit 170 (FIG. 5) and has a logic "1" level and a logic "0" level. The first flip-flop produces a first pass signal when the first flip-flop has the logic "1" level and produces a second pass signal when the first flip-flop has the logic "0" level. Supplied with the first pass signal from the first flip-flop of the buffer address counter 1726, the switching circuit 170 receives the primary buffer data to supply, as a stride memory input data, the primary buffer data to the memory device 18 (FIG. 1). Supplied with the second pass signal from the first flip-flop of the buffer address counter 1726, the switching circuit 170 receives the primary buffer data and the second buffer data from the second buffer 162 to supply, as the stride memory input data and an indirect memory input data, the primary buffer data and the second buffer data to the memory device 18 (FIG. 1).

The buffer address counter 1726 is supplied with the access stride mode signal and the access indirect mode signal from the address decoder 1720. Supplied with the access stride mode signal from the address decoder 1720, the buffer address counter 1726 receives the clock pulses of the clock signal at the first flip-flop and counts the clock pulses to produce a stride buffer address signal. Supplied with the access indirect mode signal from the address decoder 1720, the buffer address counter 1726 receives the clock pulses of the clock signal at the second flip-flop and counts the clock pulses to produce an indirect buffer address signal.

FIG. 5 will again be referred to. When the first and the second buffers 161 and 162 are supplied with the stride buffer address signal from the buffer address counter 1726, the primary buffer data of a particular buffer element are supplied through the switching circuit 170, as the stride memory input data, to the memory device 18 (FIG. 1). The particular buffer element is one of the buffer elements of the first and the second buffers 161 and 162 that is indicated by the primary buffer address signal. When the first buffer 161 is supplied with the indirect bufer address signal from the buffer address counter 1726 (FIG. 6), the first buffer data of a particular buffer element is supplied to the address selector 1718 and the indirect address register 1721 (FIG. 6). The particular buffer element is one of the buffer elements of the first and the second buffers 161 and 162 that is indicated by the indirect buffer address signal. Supplied with the first buffer data from the first buffer 161 and the access indirect mode signal from the access decoder 1720, the address selector 1718 (FIG. 6) supplies, as the indirect address signal, the first buffer data to the memory decoder 181 of the memory device 18 (FIG. 2). In other words, the indirect address signal is supplied from the address selector 1728 to a part of the memory device 18 that is different from the memory banks 1801 through 1816. When the second buffer 162 is supplied with the indirect buffer address signal from the buffer address counter 1726 (FIG. 6), the second buffer data of a particular buffer element is supplied through the switching circuit 170, as the indirect memory input data, to the memory device 18 (FIG. 1). The particular buffer element is one of the buffer elements of the first and the second buffers 161 and 162 that is indicated by the indirect buffer address signal.

Turning back to FIG. 2, the memory decoder 170 is connected to the address selector 1718 and the access selector 1725 (FIG. 6). The memory device 18 is connected to the switching circuit 170 (FIG. 5). Supplied with the stride address signal from the address selector 1718 (FIG. 6) and the access stride mode signal from the access selector 1725 (FIG. 6), the memory decoder 181 specifies by the stride address signal, as a stride specified memory bank and a stride specified memory element, a particular memory bank of the memory banks 1801 to 1816 and a particular memory element of the memory elements to send the stride memory input data to the stride specified memory element of the stride specified memory bank when the memory device 18 is supplied with the stride memory input data from the switching circuit 170 (FIG. 5).

Supplied with the indirect address signal from the address selector 1718 (FIG. 6) and the access indirect signal from the access selector 1725 (FIG. 6), the memory decoder 181 specifies by the indirect address signal, as an indirect specified memory bank and an indirect specified memory element, a specified memory bank of the memory banks 1801 to 1816 and a specific memory element of the memory elements to send the indirect memory input data to the indirect specified memory element of the indirect specified memory bank when the memory device 18 is supplied with the indirect memory input data from the switching circuit 170 (FIG. 5).

What is claimed is:

1. A vector processing device, in combination with a memory device, selectively operable in a stride vector processing mode and an indirect vector processing mode, said vector processing device processing vector data into one of a stride memory input data and an indirect memory input signal including an indirect memory input data and an indirect address signal indicating a memory address of said memory device, said vector processing device comprising:

a command control unit for producing, in compliance with a program, an indirect register select signal and an indirect mode signal representative of said indirect vector processing mode, a stride register select signal and a stride mode signal representative of said stride vector processing mode, and a stride address signal indicating a memory address of said memory device;

vector register selecting means connected to said command control unit and a plurality of vector registers for selecting, in response to said indirect register select signal, first and second registers of said vector registers, to receive first and second selected data from said first and second registers, said vector register selecting means further selecting, in response to said stride register select signal, a third register of said vector registers, to receive a third selected data from said third register;

data holding means connected to said vector register selecting means for holding, as first, second and third held data, the first, second and third selected data received by said vector register selecting means; and an access control unit connected to said memory device, said command control unit, and said data holding means for supplying, in response to said indirect mode signal, said first held data as said indirect address signal to said memory device and said second held data as said indirect memory input data to said memory address of said memory device that is indicated by said indirect address signal, said access control unit further supplying, in response to said stride mode signal, said stride address signal to said memory device and said third held data as said stride memory input data to said memory address of said memory device that is indicated by said stride address signal.

2. A vector processing device as claimed in claim 1, said memory device including a plurality of memory banks, said first held data containing a bank address portion and an element address portion, said bank address portion indicating one of said memory banks as a particular bank, said element address portion indicating the memory address of the particular bank, wherein said access control unit comprises:

a bank address signal holding circuit connected to said data holding means for holding said bank address portion as a bank address held signal;

a bank access signal holding circuit connected to said bank address signal holding circuit for holding a bank access signal;

a bank access checking circuit connected to said bank address signal holding circuit and said bank access signal holding circuit for checking whether or not said bank address held signal and said bank access signal are coincident with each other, said bank access checking circuit producing a bank coincidence signal when said bank address held signal and said bank access signal are coincident with each other;

an access judging circuit connected to said bank access checking circuit for producing an inhibit signal when supplied with said bank coincidence signal and producing a shift signal when not supplied with said bank coincidence signal;

a shift signal supply circuit connected to said access judging circuit and said bank address signal holding circuit for supplying said shift signal to said bank address signal holding circuit, upon receipt of said shift signal, said bank address signal holding circuit transferring said bank address held signal to said bank access signal holding circuit as said bank access signal; and an access signal output control circuit connected to said memory device, said command control unit, said data holding means and said access judging circuit for supplying said first held data as said indirect address signal to said memory device and said second held data as said indirect memory input data to the memory address of the particular bank in response to said indirect mode signal when said access judging circuit does not produce said inhibit signal, said access signal output control circuit further supplying, in response to said stride mode signal, said stride address signal to said memory device and said third held data as said stride memory input data to said memory address of said memory device that is indicated by said stride address signal.

3. A vector processing apparatus comprising:

a memory device;

means for selectively operating said apparatus in one of a stride vector processing mode and an indirect vector processing mode;

means for processing vector data into one of a stride memory input data and an indirect memory input signal including an indirect memory input data and an indirect address signal indicative of a memory address of said memory device;

a command control unit producing, in compliance with a program, an indirect register select signal and an indirect mode signal representative of said indirect vector processing mode, a stride register select signal and a stride mode signal representative of said stride vector processing mode and a stride address signal indicating a memory address of said memory device;

vector register selecting means connected to said command control unit and a plurality of vector registers for selecting, in response to said indirect register select signal, first and second registers of said vector registers, to receive first and second selected data from said first and second registers, said vector register selecting means further selecting, in response to said stride register select signal, a third register of said vector registers, to receive a third selected data from said third register;

data holding means connected to said vector register selecting means for holding, as first, second and third held data, the first, second and third selected data received by said vector register selecting means; and an access control unit connected to said memory device, said command control unit, and said data holding means, said access control unit supplying, in response to said indirect mode signal, said first held data as said indirect address signal to said memory device and said second held data as said indirect memory input data to said memory address of said memory device that is indicated by said indirect address signal, said access control unit further supplying, in response to said stride mode signal, said stride address signal to said memory device and said third held data as said stride memory input data to said memory address of said memory device that is indicated by said stride address signal.

4. A vector processing apparatus as claimed in claim 3, wherein said memory device includes a plurality of memory banks, and wherein said first held data includes a bank address portion and an element address portion, said bank address portion indicating one of said memory banks as a particular bank, said element address portion indicating the memory address of the particular bank, and wherein said access control unit further comprises:

a bank address signal holding circuit connected to said data holding means, holding said bank address portion as a bank address held signal;

a bank access signal holding circuit connected to said bank address signal holding circuit, holding a bank access signal;

a bank access checking circuit connected to said bank address signal holding circuit and said bank access signal holding circuit for checking whether or not said bank address held signal and said bank access signal are coincident with each other, said bank access checking circuit producing a bank coincidence signal when said bank address held signal and said bank access signal are coincident with each other;

an access judging circuit connected to said bank access checking circuit for producing an inhibit signal when supplied with said bank coincidence signal and producing a shift signal when not supplied with said bank coincidence signal;

a shift signal supply circuit connected to said access judging circuit and said bank address signal holding circuit, said shift signal supply circuit supplying said shift signal to said bank address signal holding circuit upon receipt of said shift signal, said bank address signal holding circuit transferring said bank address held signal to said bank access signal holding circuit as said bank access signal; and an access signal output control circuit connected to said memory device, said command control unit, said data holding means and said access judging circuit, said access signal output control circuit supplying said first held data as said indirect address signal to said memory device and said second held data as said indirect memory input data to the memory address of the particular bank in response to said indirect mode signal when said access judging circuit does not produce said inhibit signal, said access signal output control circuit further supplying, in response to said stride mode signal, said stride address signal to said memory device and said third held data as said stride memory input data to said memory address of said memory device that is indicated by said stride address signal.

* * * * *